N. W. HALSEY.
VIEW FINDER FOR CAMERAS.
APPLICATION FILED AUG. 20, 1915.
1,267,404.
Patented May 28, 1918.
FIG. 1.
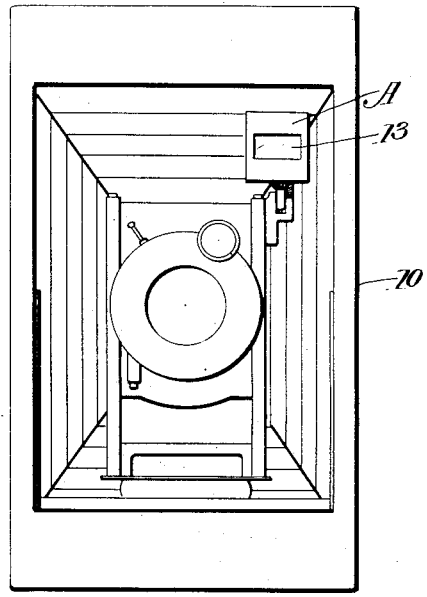
FIG. 2.
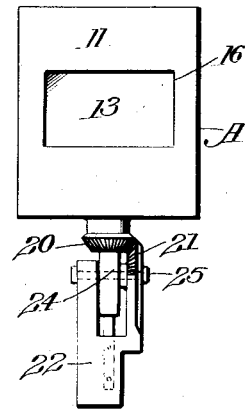
FIG. 3.
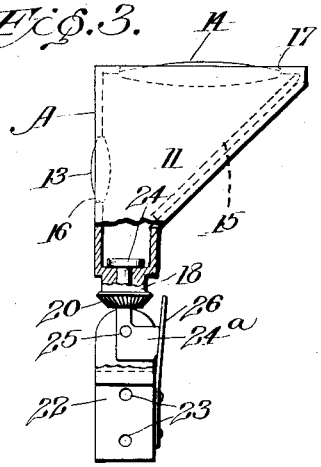
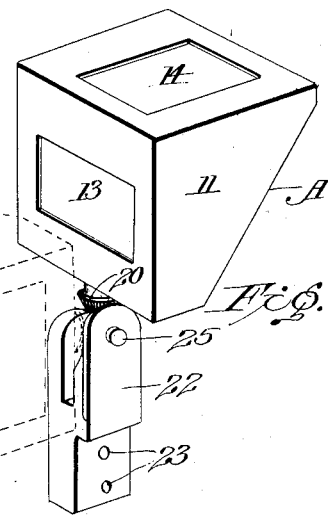
FIG. 4.
Witnesses
G. H. Baker
R. C. Watson
Inventor
Norman W. Halsey
by Foster Freeman Watson &c
Attorney

UNITED STATES PATENT OFFICE.

NORMAN W. HALSEY, OF NEW YORK, N. Y.

VIEW-FINDER FOR CAMERAS.

1,267,404.  Specification of Letters Patent.  Patented May 28, 1918.

Application filed August 20, 1915. Serial No. 46,508.

*To all whom it may concern:*

Be it known that I, NORMAN W. HALSEY, a citizen of the United States, and resident of the city, county and State of New York, have invented certain new and useful Improvements in View-Finders for Cameras, of which the following is a specification.

This invention relates to view finders for cameras, particularly to view finders for cameras using elongated films or plates and which are adapted to take exposures with the longer axis of the film in either a vertical or a horizontal position.

The object of my invention is to improve and simplify the construction of view finders and to provide a finder which will show therein the exact field in front of the camera which will appear in the picture when the camera is arranged to take either vertical or horizontal views.

It will be understood that by the terms "vertical pictures" and "horizontal pictures" used in this specification are meant pictures taken with the long axis of the film arranged vertically and horizontally respectively.

Camera finders usually comprise an objective lens through which the rays of light pass from objects in front of the camera, a reflecting surface to reflect the rays, and a surface on which the rays are focused. The finders of cameras which are adapted to be held in only one position in taking pictures, as those which use square films, have a shield over the focusing surface of the finder with an aperture therein similar in shape and proportional in size, to the film in use so that the view visible in the aperture is identical with the view which will appear on the film. In cameras which use elongated rectangular films this shield or cover has been made with an aperture therein in the shape of a Maltese cross one rectangle of which is adapted to disclose the field when vertical pictures are being taken, the other rectangle being adapted to disclose the field when taking horizontal pictures, the finder being turned about an axis to bring the desired rectangle of the aperture into operative position.

One defect of the Maltese cross finder is that the photographer must determine the horizontal field from the vertical field by means of imaginary lines. As it is very difficult to judge in this way the limits of the field in taking pictures, films are sometimes spoiled because the photographer has overestimated the field when examining the finder and has taken an incomplete picture. To overcome this and other defects I have produced the camera finder hereinafter described and shown in the accompanying drawings, in which, Figure 1 is a front elevation of a camera of the folding type having my improved finder attached thereto and arranged in position to take a vertical picture;

Fig. 2 is a front elevation of the finder showing the details of construction;

Fig. 3 is a side elevation of the finder, partly broken away; and

Fig. 4 is a perspective showing by means of full and dotted lines the two positions of the finder.

The camera 10 is here shown to be of the folding type but it may be of any well known type which is adapted to use a film or plate having a greater length than width, and adapted to take either vertical or horizontal pictures.

The finder A is an exact radius view finder and consists of a casing or frame 11 preferably of light thin metal such as sheet aluminum, two lenses 13 and 14, arranged at right angles to each other in different faces of the finder, and a mirror 15 arranged diagonally within the frame and adapted to reflect the light rays which enter through one lens, to the other lens, on which they are focused.

Two openings 16 and 17 are cut in the frame of the finder over the lenses for the purpose of admitting light into the same. These openings are made proportional to the size of the film used, and each opening is of such size as to completely show in the finder everything which will appear in the picture and nothing more. Due to the peculiar manner in which the finder is pivoted it may be swung around so that either lens may be made the objective lens, as it were, and the other the image glass.

Thus the lens 13 is the image glass when taking horizontal pictures and the lens 14 is the image glass when taking vertical pictures. In each case when one of the lenses is the image glass the other is the objective.

Projecting centrally from the bottom of the finder is a boss 18 having a pivot hole therein, extending through the bottom wall of the finder. On the lower end of the boss is a bevel gear 20. This gear being rigidly attached to the finder of course will rotate with it. The gear 20 meshes with bevel gear teeth 21 formed in the upper part of one prong of a U-shaped bracket 22, which is attached at its lower end to the camera by means of screws 23.

A shaft 24 passes up through the hole 19 in the boss and has its upper end headed to retain the finder. The lower end of the shaft 24 is flat and rectangular or flag shaped and is pivoted between the sides of the U-shaped bracket 22 on trunnions 25 which may be integral with pivot 24 if desired. The finder is thus pivotally mounted on the member 22 and the bevel gears 20 and 21 are held in mesh. The finder is at all times free to rotate about the pivot 24, and as the gear 20 is rigid with the finder and the gear 21 relatively immovable, it is evident that when the finder is pushed forward around the trunnions 25 as a pivot, the gear 20 will cause the finder to rotate. Thus in moving the finder forward on its trunnions from the full line position in Figs. 1 and 4 through a quarter circle to its dotted line position, (Fig. 4), the finder will be rotated on its pivot by the gear, through a quarter of a circle.

As the finder must be held with its focal axis parallel to the focal axis of the camera, when taking pictures, I provide a leaf spring 26 which is fastened to the bracket 22 and presses against one or other of the edges of the flat right angled end 24$^a$ of the pivot 24 and holds the finder with either one or the other of its focal axes parallel to the focal axis of the camera.

When applied to folding cameras the finder is preferably attached, as shown in Fig. 1 of the drawings, where it occupies only as much space as the ordinary finder. The finder may also be attached to a box camera or non-folding camera.

This improved finder is simple, inexpensive, easily manipulated and has the great advantage that it shows the photographer exactly what field the film can take without any estimation on his part whether the camera is held in a position to take either vertical or horizontal pictures.

Having described my invention what I claim and desire to secure by Letters-Patent is, 1. In a camera, a view finder having two rectangular openings with lenses therein and a mounting for said finder whereby it is rotated on two axes to bring the axis of either lens into parallelism with the focal axis of the camera.

2. In a camera, a view finder having two rectangular openings with lenses therein, a bracket on which the finder is mounted, and connections between the bracket and finder whereby the latter is caused to rotate about two axes at right angles to each other when shifting from one position to another.

3. In a camera, a view finder having two rectangular openings with lenses therein, a bracket on which the finder is mounted, and connections between the bracket and finder whereby the latter is caused to rotate about two axes at right angles to each other when shifting from one position to another, said connections comprising gear teeth on the finder engaging teeth on the bracket.

4. In a camera, a view finder having two rectangular openings with lenses therein, a bracket on which the finder is mounted, and connections between the bracket and finder whereby the latter is caused to rotate about two axes at right angles to each other when shifting from one position to another, and means for yieldingly holding the finder in either operative position.

5. In a view finder, a casing having two rectangular openings therein and arranged to rotate on its axis and to revolve about a fixed line, a lens mounted in each of said openings, and means whereby said casing is rotated on its axis when it is revolved about said fixed line.

6. In a view finder, a casing having two rectangular openings therein, a lens in each of said openings, and means whereby said casing is rotated on an axis while being revolved about a fixed line at right angles to said axis.

7. In a view finder, a casing having an elongated opening in each of two faces thereof, the axes of said openings being at right angles to each other, an oblique mirror mounted in said casing, and means whereby said casing is rotated on an axis and revolved about a relatively fixed line to bring one or other of said openings into operative position.

8. A finder for photographic cameras having an optical system provided with two separated apertures, each conforming to a required field of view for a different operating position of a camera, and adapted to serve alternatively as a view aperture or as an objective aperture.

9. A finder for photographic cameras having an optical system provided with a pair of apertures, each conforming to a required field of view, and located respectively at opposite ends of said optical system, and means whereby the finder may be so moved that either aperture may serve as an objective aperture or as a view aperture.

10. A finder for photographic cameras having, in combination, an optical system adapted to receive a view at either end and to project said view upon the other end thereof, said optical system having an aperture associated with each of its ends, adapted to define the field of view; and means whereby the optical system may be moved so that either aperture may be correctly correlated with a camera to serve as a view aperture while the other serves as an objective aperture.

11. A finder for photographic cameras having an optical system comprising a pair of lenses, each a duplicate of the other, and a reflector, and having an aperture associated with each lens conforming to a required field of view; and a mounting, whereby the finder may be moved to direct either lens, with its respective aperture, toward the front of a camera and the other lens toward one side of said camera.

12. A finder for photographic cameras having, in combination, an optical system in which the objective lens and the view glass are interchangeable in function, said objective lens and said view glass each being provided with an aperture conforming to a required field of view; a mounting adapted to produce a movement whereby the lens which serves as the objective lens of the finder in one operative position of a camera may be set to serve as the view glass in another position of the camera, with its associated aperture correctly correlated with the camera to serve as a view aperture; and suitable means for limiting the movement of the finder to accord with different operative positions of the camera.

13. A finder for photographic cameras having, in combination a reversible optical system provided with an oblong aperture of the same dimensions at each end, the longer dimensions of said apertures extending at right angles to each other; and means for mounting said finder upon a camera whereby said finder may be turned to bring either aperture to the front.

14. A finder for photographic cameras having, in combination, lenses of the same focal length arranged with their axes normal to each other, each of said lenses being provided with an aperture conforming to a required field of view, a reflector located at the intersection of the axes of said lenses and forming an angle of 45 degrees therewith, and means for mounting said finder upon a camera body whereby said finder may be turned to bring either lens to the front to serve as an objective lens and the other lens into position to serve as a view glass.

15. A finder for photographic cameras having, in combination, two aperture plates in fixed relations to each other, the apertures in said plates being oblong and the same in dimensions, and their longer dimensions extending at right angles to each other, a lens associated with each of said apertures, the focal length of said lenses being equal and their axes being normal to each other, a reflector located at the intersection of the axes of said lenses and forming an angle of 45 degrees therewith, and means for mounting said finder upon a camera body whereby said finder may be turned to bring either lens to the front to serve as the objective lens for the finder.

In testimony whereof I affix my signature.

NORMAN W. HALSEY.